Patented Aug. 13, 1946

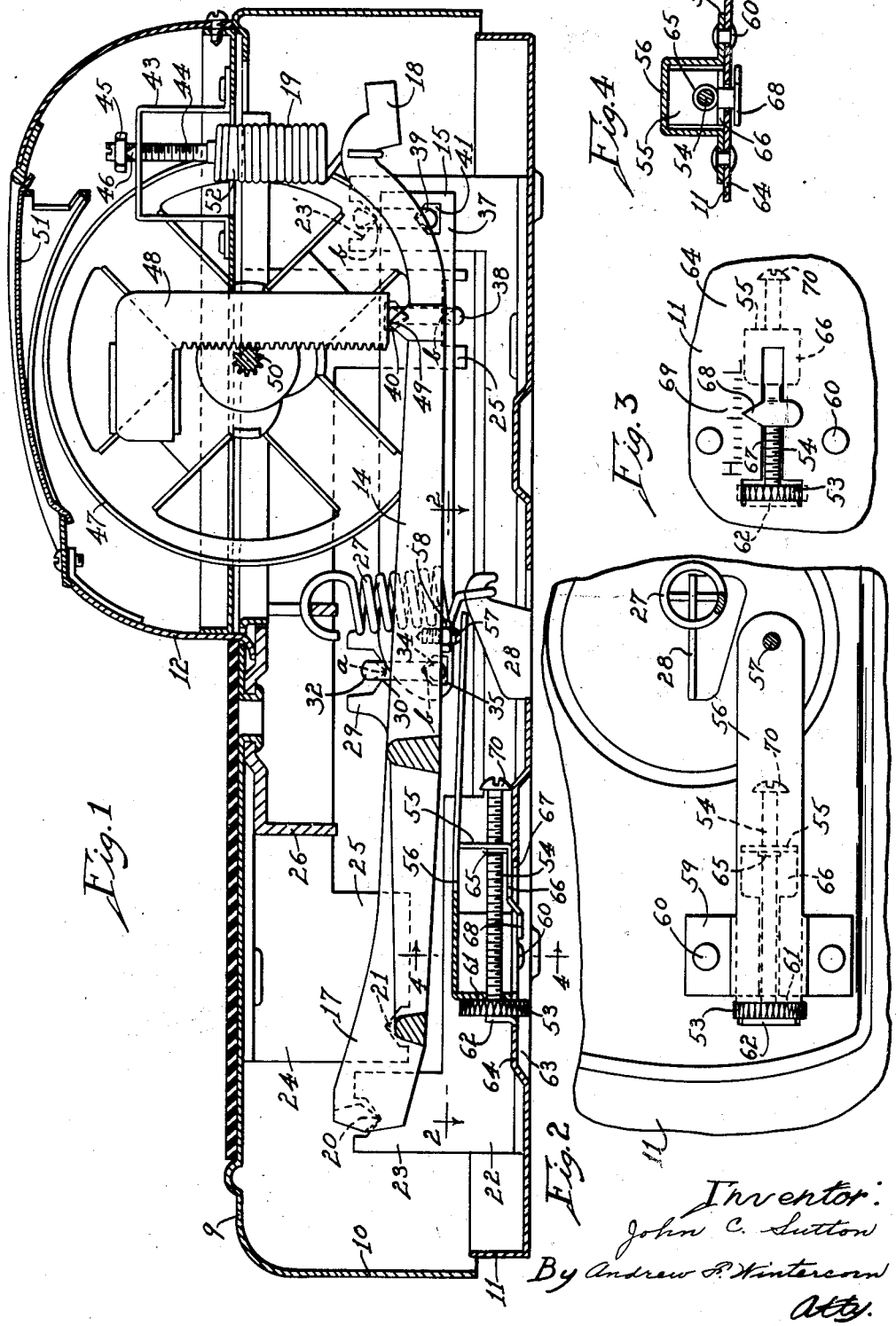

2,405,619

UNITED STATES PATENT OFFICE 2,405,619

BATHROOM SCALE WEIGHT ADJUSTMENT

John C. Sutton, Rockford, Ill., assignor to The Brearley Company, Rockford, Ill., a corporation of Illinois Application January 24, 1944, Serial No. 519,431

10 Claims. (Cl. 265—68)

This invention relates to weighing scales and more particularly bathroom type scales, and has particular reference to a new and improved weight adjustment.

It has heretofore been the practice to make a more or less permanent weight adjustment on each scale at the factory at the time of assembly. However, it has been found that by the time a scale gets into the hands of the ultimate user it may not weight correctly due to any one of a number of things, and, hence, unless the user has the facilities with which to change the weight adjustment that was made at the factory, which would almost invariably necessitate dismantling of the scale or a good portion thereof, the scale is of little or no value for the purpose intended and might even, in extreme cases, have to be discarded. It is, therefore, the principal object of my invention to provide a manually operable weight adjustment by means of which the user may correct the weighing of the scale regardless of whether it weighs high or low in relation to a correct weight.

A salient feature of the weight adjustment of my invention is the provision of a supplementary or auxiliary spring, the effectiveness of which to resist deflection of the lever mechanism of the scale against the resistance of the main counterbalancing spring may be varied either way from a mean condition to suit the requirements in any given case.

The invention is illustrated in the accompanying drawing, in which—

Figure 1 is a longitudinal section through a bathroom scale embodying a weight adjustment made in accordance with my invention;

Fig. 2 is a horizontal sectional detail taken on the line 2—2 of Fig. 1 looking down on the weight adjustment;

Fig. 3 is a face view of the bottom of the scale at the weight adjustment, and

Fig. 4 is a cross-section through the weight adjustment taken on the line 4—4 of Fig. 1.

The same reference numerals are applied to corresponding parts throughout the views.

Referring to Fig. 1 in which a scale like that disclosed in my Patent 2,293,572 is illustrated, 9 designates the sheet metal platform of inverted cupped form providing depending side walls 10 enclosing the base 11 which is also of cupped sheet metal construction. 12 is a dial housing disposed in the longitudinal median plane of the platform leaving ample foot room on opposite sides thereof. In place of the usual wishbone levers for supporting the platform on the base, there is a main lever 14 and two secondary levers 15. The lever 14 is generally wishbone shaped, providing the forked portion 17 on the rear end of the arm 18 which extends longitudinally with respect to the base 11 toward the front end thereof for connection with the weighing spring 19. Each branch of the forked portion 17 has a downwardly facing knife edge 20 on the rear end thereof and an upwardly facing knife edge 21 in forwardly spaced relation thereto. Angular sheet metal pieces 22 are suitable secured to the base 11 in parallel longitudinal relationship and have upward projections 23 on the rear ends thereof to serve as fulcrums for the knife edges 20. Other angular sheet metal pieces 24 are secured to the under side of the platform 9 in parallel longitudinal relationship and have downward projections 25 on the rear ends thereof affording fulcrums for engagement with the knife edges 21, as shown. A transverse brace 26 of sheet metal channel construction is also secured to the under side of the platform 9 and suitably interlocked at the opposite ends with the pieces 24 to reenforce the platform and also provide a place for anchoring the upper end of the coiled tension spring 27, the lower end of which is anchored to the base 11 on a hook-shaped upward projection 28, as shown. Two forked projections 29 are provided on the opposite sides of the forked portion 17 of the wishbone lever 14, each providing transversely aligned fulcrums 30 for the downwardly facing knife edges $a$ of a swing bearing 32. Each of the swing bearings 32 is cast to provide a middle upwardly facing knife edge $b$ in downwardly offset relation to the knife edges $a$ adapted to cooperate with a fulcrum 34 provided in a hole 35 in the rear end of the associated lever 15. Each of the levers is formed from two straps of sheet metal riveted together and bent apart at the forward end to form a fork 37 in which two swing bearings 38 and 39, like the swing bearings 32, are loosely assembled and fulcrumed in holes 40 and 41. Each of the bearings 38 has its middle knife edge $b$ facing upwardly to engage the downward projection 25' serving as a fulcrum on the front end of the associated angular sheet metal piece 24, previously mentioned. Each of the swing bearings 39 has its middle knife edge $b$ facing downwardly for fulcrum engagement with an upward projection 23' on the front end of the associated angular piece 22, previously mentioned.

A scale constructed along these lines is free from the objectionable binding action and sliding friction common in other constructions, because it is obvious that the two projections 23 are all that determine the relationship of the wishbone lever 14 with respect to the base 11 by engagement of the knife edges 20. Hence there can be no binding or rubbing to interfere with accurate weighing in so far as this portion of the scale is concerned. In like manner, the two projections 25 determine the relationship of the platform 9 with respect to the lever 14 by engagement with the knife edges 21, so that binding and rubbing is eliminated. The levers 15, due to the swing bearings 32, 38 and 39, are free to shift longitudinally and laterally to compensate for any irregularity there may be in regard to the longitudinal or lateral spacing of the upward projections 23′ with respect to the related projections 23 or downward projections 25′ with respect to their related projections 25. It is apparent, therefore, that no binding or rubbing can occur anywhere to interfere with accurate weighing. Now, of course, such a construction would result in objectionable wabbliness if the scale were otherwise of conventional construction, because even the conventional scale with two fairly rigid wishbone levers disposed in the conventional manner between the platform and base gave rise to the objection that the platform was so loosely connected with the base that one could not readily pick up the scale and carry it from one place to another, and care had to be exercised to pick up the scale by its base. The self-aligning construction is made feasible by the provision of the platform retaining spring 27 in addition to the weighing spring 19. This spring has the sole function of keeping the scale parts under spring tension at all times. It urges the platform 9 toward the base 11, and being centrally located with respect to all of the knife edges and cooperating fulcrums, it is obvious that the spring pressure is substantially uniformly distributed to all of the knife edges. The spring tension is heavy enough so that one may lift the scale by means of the platform without the usual noticeable lost-motion connection between the base and platform: the base will lift with the platform as one unit.

When weight is applied to the platform 9, the lever 14 is forced downwardly under the load imposed thereon directly by the downward projections 25 and under the load transmitted to the lever 14 through the levers 15 on which the downward projections 25′ bear. The weighing spring 19, which is supported on a bracket 43 on the platform 9 but may instead be supported on the base 11, is stretched by the downward deflection of the lever 14, simultaneously with the retraction of the spring 27. Since the spring 27 is a subtracting force, the spring 19 is proportionately heavier than what would otherwise be employed. A screw 44 has an adjusting nut 45 to support the spring 19 on the knife edge projections 46 on the bracket 43, and adjustment of this nut is for setting the scale to a zero reading of the dial 47. A rack 48 rests at its lower end on a knife edge 49 on the arm 18, and gravitates as the lever 14 is deflected downwardly by the application of weight on the platform, thereby turning the dial 47 by means of the pinion 50 which meshes with the rack 48, as shown. The dial 47 carries the usual weight graduations on the periphery thereof to cooperate with a hairline, or other index mark, on or adjacent the window 51 through which the dial is visible to the user standing on the platform 9. In many scales the adjusting nut 45 is made easily accessible for adjustment, to set the scale back to zero, but in the present case the nut 45 is not intended to be adjusted after the scale leaves the factory and should not require adjustment by the user, due to the fact that the scale construction disclosed operates with so little friction that there is no necessity for resetting back to zero. The plate 52, which is in the nature of a crosshead on the lower end of the screw 44, is screwed into the upper end of the spring 19 to provide an adjustable connection between the spring 19 and the screw 44 to provide the conventional weighing adjustment. In the assembling of the scale at the factory, the plate 52 is adjusted to shorten or lengthen the spring to make the scale weigh correctly, and, of course, once that adjustment has been made it is permanent and it is not intended for the user to change it. However, in accordance with the present invention, an adjusting knob 53 is provided, accessible on the bottom of the scale, for the user to adjust when and if the scale when in use is found to weigh incorrectly, for any reason, whether it be because of an improper adjustment of the plate 52 in the first instance, as may occur in isolated instances in quantity production of these scales, or due to slight damage to some of the knife edges in the shipment of the scale, or due to rough handling of the scale in the store prior to the sale of the scale to the ultimate user, or rough treatment of the scale in the home by the user or his children. Sometimes the springs 19 and 27 show evidence of a slight change in tension after a scale has been in use for a certain length of time, and that is believed to be due in some cases to climatic conditions, or to the high or low temperature of the particular spot where the scale may be kept. Whatever the cause, the weight adjustment provided at 53 in accordance with my invention is designed to give the user the means whereby a scale, which might otherwise be of little or no good to him because of incorrect weighing, and might even have to be discarded for that reason, can be put back into satisfactory operating condition and substantially as good as new.

In the weight adjustment herein shown, the knob 53 is arranged to turn a screw 54 to slide an adjustable fulcrum 55 lengthwise with respect to the bottom of a leaf spring 56 and accordingly vary the resistance to deflection of this spring, the same being disposed under the arm 18 of the wishbone lever 14 and adapted to be deflected in the downward movement of the lever under weight. A pointed set screw 57 is threaded in a hole in the bottom of the arm 18 and is arranged to bear on the top of the leaf spring 56 near the free end thereof, and a lock nut 58 is threaded on the projecting portion of the screw 57 and is tightened against the arm 18 to lock the screw in adjusted position. The leaf spring is rigidly supported on the base 11 at the end remote from the screw 57, and has ears 59 riveted to the base, as indicated at 60. The screw 54 extends freely through a hole in the downwardly projecting lug 61 provided on the rear end of the spring 56, and the knob 53 is disposed behind the lug 61 and in front of an upwardly projecting lug 62 provided on the base 11, whereby the screw 54 is held against endwise movement but is free to be turned by means of the knob 53, which projects below the base 11 in the space 63 provided under the embossed portion 64 of the base. The fulcrum 55 has a boss portion 65 in which the screw 54 is threaded, and has a base portion 66 at right angles to the boss portion for slidably supporting the fulcrum on the flat top of the embossed portion 64 of the base 11. A slot 67 is provided in the embossed portion 64 of the base for projection therethrough of a pointer 68 formed integral with the base portion 66 of the fulcrum 55, and this pointer cooperates with graduations 69 provided on the under side of the base, to indicate the position of adjustment of the fulcrum between the two limit positions designated by the letters H and L, H standing for "High" and L for "Low."

In operation, when the user notices that the scale is weighing incorrectly, he can adjust it by turning the knob 53 in one direction or the other. If the scale is weighing too high, the knob 53 should be turned to bring the pointer 68 closer toward the L end of the graduated scale 69, because, in so doing, the fulcrum 55 will be moved toward the free end of the leaf spring 56, thereby increasing the resistance to deflection of the spring and accordingly making the weight indication lower for the same weight placed on the platform 9. If the scale is weighing too low, the knob 53 should be turned in the opposite direction, to bring the pointer 68 closer to the H or high end of the graduated scale 69. In the assembling of the scale at the factory, the slotted head 70 on the screw 54 will be turned to adjust the fulcrum 55 to a point corresponding approximately to a mid-position of adjustment so far as the location of the pointer 68 with relation to the graduated scale 69 is concerned, and in that way the ultimate user is afforded a reasonably large range of adjustment either way, that is, to make the scale read higher if that is necessary or lower if that is necessary. The plate 52 is then adjusted in the end of the spring 19 to whatever extent is necessary to make the scale give a correct weight indication, and, of course, the scale leaves the factory with that adjustment and no change is made until and unless the user finds it necessary to make a corrective adjustment by means of the knob 53.

It is believed the foregoing description conveys a good understanding of the objects and advantages of my invention. The appended claims have been drawn to cover all legitimate modifications and adaptations.

I claim:

1. A weighing scale, comprising a base, a platform, a lever mechanism for movably supporting the platform on the base, weighing spring means restraining movement of the lever mechanism, weight indicating means operable upon movement of the lever mechanism, an adjustment for said weighing spring means, a leaf spring arranged to be deflected relative to the base by said lever mechanism in a weighing operation, a fixed support for one end of said spring on said base, a slidable fulcrum for said spring adjustable lengthwise thereof toward and away from said fixed support, a pointer on said fulcrum movable in the sliding adjustment thereof relative to a suitably graduated scale on the base, a screw extending lengthwise relative to said spring and threaded in said fulcrum for its adjustment and supported on said base without freedom for endwise movement, and manually adjustable means for turning said screw.

2. A weighing scale, comprising a base, a platform, a lever mechanism for movably supporting the platform on the base, weighing spring means restraining movement of the lever mechanism, weight indicating means operable upon movement of the lever mechanism, an adjustment for said weighing spring means, a leaf spring arranged to be deflected relative to the base by said lever mechanism in a weighing operation, said base having an upwardly embossed slotted portion, a support for said leaf spring thereon, a slidable fulcrum for said spring resting on said embossed portion and having a pointer projecting downwardly through the slot therein to move relative to suitable graduations on the under side of said embossed portion, a screw threaded in said fulcrum for its adjustment lengthwise relative to said spring and supported on said base for rotation and against endwise movement, and a knob on one end of said screw and projecting through a slot provided in said embossed portion for manual operation from outside of said base in the embossed portion.

3. A scale as set forth in claim 2, including a slotted head on the other end of said screw permitting adjustment thereof from above the base in the assembling of the scale.

4. A weighing scale, comprising a base, a platform, a lever mechanism for movably supporting the platform on the base, weighing means restraining movement of the lever mechanism, weight indicating means operable upon movement of the lever mechanism, a leaf spring arranged to be deflected relative to the base by said lever mechanism in a weighing operation, a fixed support for one end of said spring on said base, a slidable fulcrum for said spring adjustable lengthwise thereof toward and away from said fixed support, a pointer on said fulcrum movable in the sliding adjustment thereof relative to a suitably graduated scale on the base, a screw extending lengthwise relative to said spring and threaded in said fulcrum for its adjustment and supported on said base without freedom for endwise movement, and manually adjustable means for turning said screw.

5. A weighing scale, comprising a base, a platform, a lever mechanism for movably supporting the platform on the base, weighing means restraining movement of the lever mechanism, weight indicating means operable upon movement of the lever mechanism, a leaf spring arranged to be deflected relative to the base by said lever mechanism in a weighing operation, said base having an upwardly embossed slotted portion, a support for said leaf spring thereon, a slidable fulcrum for said spring resting on said embossed portion and having a pointer projecting downwardly through the slot therein to move relative to suitable graduations on the under side of said embossed portion, a screw threaded in said fulcrum for its adjustment lengthwise relative to said spring and supported on said base for rotation and against endwise movement, and a knob on one end of said screw and projecting through a slot provided in said embossed portion for manual operation from outside of said base in the embossed portion.

6. A scale as set forth in claim 5, including a slotted head on the other end of said screw permitting adjustment thereof from above the base in the assembling of the scale.

7. A weighing scale comprising a base member, a platform member, means for movably supporting the platform member on the base member, weighing means restraining such movement, weight indicating means operable upon such movement, an elongated leaf spring mounted on the base member and arranged to be deflected in a weighing operation, said base member having a slotted portion adjacent said leaf spring, a fulcrum for said spring on said slotted portion, a screw extending lengthwise relative to said spring and the slot and arranged upon rotary adjustment to cause endwise adjustment between said spring and fulcrum, a pointer projecting outwardly through the slot and movable relative to suitable graduations on the outside of said slotted portion in such endwise adjustment to indicate the extent thereof, and a knob on one end of said screw and projecting through a slot provided in said base member for manual operation from outside of said base.

8. A scale as set forth in claim 7, including a slotted head on the other end of said screw permitting adjustment thereof from inside the base member in the assembling of the scale.

9. A weighing scale, comprising a base, a platform, a lever mechanism for movably supporting the platform on the base, weighing spring means restraining movement of the lever mechanism, weight indicating means operable upon movement of the lever mechanism, an adjustment for said weighing spring means, a leaf spring arranged to be deflected relative to the base by said lever mechanism in a weighing operation, a support for said spring movable toward and away from said lever mechanism in a direction measured lengthwise of said spring, whereby to vary the stiffness of said spring deflected by said lever mechanism, a screw extending lengthwise relative to said spring and threaded in said support for its adjustment and supported on said base without freedom for endwise movement, and manually adjustable means for turning said screw.

10. A weighing scale, comprising a base, a platform, a lever mechanism for movably supporting the platform on the base, weighing spring means restraining movement of the lever mechanism, weight indicating means operable upon movement of the lever mechanism, an adjustment for said weighing spring means, a leaf spring arranged to be deflected relative to the base by said lever mechanism in a weighing operation, a support for said spring movable toward and away from said lever mechanism in a direction measured lengthwise of said spring, whereby to vary the stiffness of said spring deflected by said lever mechanism, a pointer movable in the adjustment of said support relative to a suitably graduated scale on the base, a screw extending lengthwise relative to said spring and threaded in said support for its adjustment and supported on said base without freedom for endwise movement, and manually adjustable means for turning said screw.

JOHN C. SUTTON.